(12) United States Patent
Johnson et al.

(10) Patent No.: US 6,430,420 B1
(45) Date of Patent: Aug. 6, 2002

(54) BREAKOUT TEST BOX FOR MONITORING SIGNAL INTEGRITY IN A MODULAR BASE STATION

(75) Inventors: Mitchell K. Johnson, McKinney; Maurice Bertrand, Dallas, both of TX (US)

(73) Assignee: Samsung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 09/528,359

(22) Filed: Mar. 17, 2000

Related U.S. Application Data

(63) Continuation-in-part of application No. 09/149,168, filed on Sep. 8, 1998.
(60) Provisional application No. 60/058,228, filed on Sep. 9, 1997.

(51) Int. Cl.[7] .................................................. H04Q 7/00
(52) U.S. Cl. ........................ 455/561; 455/550; 455/562; 455/67.4
(58) Field of Search .................................. 455/550, 560, 455/561, 90, 562, 423, 424, 67.1, 67.4

(56) References Cited

U.S. PATENT DOCUMENTS

| | | | | |
|---|---|---|---|---|
| 5,481,588 A | * | 1/1996 | Rickli et al. | 455/67.1 |
| 5,754,560 A | * | 5/1998 | Nousiainen et al. | 455/67.4 |
| 5,768,689 A | * | 6/1998 | Borg | 455/561 |
| 5,930,707 A | * | 7/1999 | Vambaris et al. | 455/424 |
| 5,987,306 A | * | 11/1999 | Nilsen et al. | 455/67.1 |
| 6,094,577 A | * | 7/2000 | Han | 455/424 |
| 6,285,876 B1 | * | 9/2001 | Zhong | 455/424 |

* cited by examiner

*Primary Examiner*—Daniel Hunter
*Assistant Examiner*—Thuan T. Nguyen
(74) *Attorney, Agent, or Firm*—John C. Han, Esq.

(57) ABSTRACT

There is disclosed a test apparatus for use in a wireless network base station comprising a non-radio unit for processing baseband signals and a radio unit separate from the non-radio unit for transmitting and receiving radio frequency (RF) signals. The test apparatus comprises: 1) a housing; 2) a first connector coupled via a first cable to the radio unit, wherein the first cable comprises signal lines carrying base station signals between the radio unit and the non-radio unit; 3) a second connector coupled via a second cable to the non-radio unit, wherein the second cable comprises signal lines carrying the base station signals between the radio unit and the non-radio unit; and 4) a first access connector that allows a signal measuring device to monitor at least one of the base station signals.

20 Claims, 3 Drawing Sheets

BREAKOUT TEST BOX FOR MONITORING SIGNAL INTEGRITY IN A MODULAR BASE STATION

CROSS-REFERENCE TO RELATED APPLICATIONS

The present application is a continuation-in-part of co-pending U.S. patent application Ser. No. 09/149,168 for "MODULAR AND DISTRIBUTED ARCHITECTURE FOR A BASE STATION TRANSCEIVER SUBSYSTEM," filed on Sep. 8, 1998. U.S. patent application Ser. No. 09/149,168 is hereby incorporated by reference in the present disclosure as if fully set forth herein, which claims benefit of Provisional application Ser. No. 60/058,228, filed Sep. 9, 1997.

TECHNICAL FIELD OF THE INVENTION

The present invention is directed, in general, to wireless communication systems and, more specifically, to a system for monitoring the signal integrity of interconnections in a modular base station in a wireless communication network.

BACKGROUND OF THE INVENTION

Wireless communication systems, including cellular phones, paging devices, personal communication services (PCS) systems, and wireless data networks, have become ubiquitous in society. Wireless service providers continually try to create new markets for wireless devices and to expand existing markets by making wireless devices and services cheaper and more reliable. The price of end-user wireless devices, such as cell phones, pagers, PCS systems, and wireless modems, has been driven down to the point where these devices are affordable to nearly everyone and the price of a wireless device is only a small part of the end-user's total cost. To continue to attract new customers, wireless service providers concentrate on reducing infrastructure costs and operating costs while improving quality of service in order to make wireless services cheaper and better.

In order to increase the number of subscribers that can be supported in a single wireless network, wireless service providers often maximize frequency reuse by making individual cell sites smaller and using a greater number of cell sites to cover the same geographical area. Accordingly, the greater number of base stations increases infrastructure costs, operating costs, and maintenance costs. To offset these increased costs, wireless service providers are eager to implement any innovations that may reduce equipment costs, maintenance and repair costs, and operating costs, or that may increase service quality.

Conventional wireless networks contain "integrated" base stations in which RF (or radio) functions and non-RF (non-radio) functions are performed within the same physical assembly. RF functions include the transmission, reception, modulation, demodulation, amplification, and filtering of inbound and outbound signals. Non-RF functions include signal processing and switching of low-frequency signals, such as baseband and intermediate frequency (IF) signals. In integrated base stations, the RF signal transmitted by the base station may be directly monitored by built-in test equipment, such as a dedicated test equipment circuit board, installed in the chassis of the base station. The measured RF signal parameters may then be transmitted to a central monitoring facility, such as a mobile switching center, along with the normal voice and data traffic associated with the calls handled by base station.

Recently, however, base stations have been implemented in modular and distributed architectures, rather than as integrated units. In some modular and distributed designs, RF functions are implemented in one module and non-RF functions are implemented in a separate module remote from the RF functions module. One such modular and distributed base station is disclosed in U.S. Provisional Patent Application Serial No. 60/058228, filed on Sep. 9, 1997, and in U.S. patent application Ser. No. 09/149,168, filed on Sep. 8, 1998, both of which are assigned to Samsung Electronics Co., Ltd., the assignee of the present application. The teachings of U.S. Provisional Patent Application Serial No. 60/058228 and U.S. patent application Ser. No. 09/149,168 are hereby incorporated by reference into the present application as if fully set forth herein. The Pico-BTS™ system provided by Samsung Electronics Corporation incorporates a modular and distributed base station design in which RF functions are implemented in a radio unit (RU) and non-RF functions are implemented in a separate modular non-radio unit or main unit (MU).

The advantages of a modular and distributed design are many. This design results in a compact radio unit that can be mounted close to the antennas, thereby greatly reducing cable losses in the inbound and outbound RF signals. The separation of RF and non-RF elements results in easier adaption of the modular and distributed design to different RF operating conditions. If the radio unit is upgraded or replaced, it is not necessary to simultaneously upgrade or replace the main unit, and vice versa. For example, if a single non-radio main unit supports three radio units in a three sector antenna system and the main unit is replaced in order to upgrade the signal processing capability of the main unit, the three radio units are not affected. In an integrated base station, the radio units would be discarded along with the outdated main unit.

In some cases, the separation of the base station into separate modular units, such as a non-radio (main) unit and a radio unit, may make the process of monitoring and trouble-shooting the operation of the base station more difficult. Important signals that could be accessed from a single test connector in an integrated unit now are divided between two modular units. If a base station fails, one or both of the assemblies housing the main unit and the radio unit may have to be opened in order to measure the characteristics of particular signal(s) or to inject selected signals during the trouble-shooting process. This can be especially time consuming, costly, and hazardous if the radio unit is mounted with the antenna at the top of a utility pole.

Therefore, there is a need in the art for systems and methods that allow important signals to be easily monitored in a modular base station comprising a main (or non-radio) unit and a radio unit. There is a further need in the art for systems and methods which allow important signals to be monitored without having to open up the assemblies housing the base station modules.

SUMMARY OF THE INVENTION

To address the above-discussed deficiencies of the prior art, it is a primary object of the present invention to provide a test apparatus for use in a wireless network base station comprising a non-radio unit capable of processing baseband signals and a radio unit separate from the non-radio unit capable of transmitting and receiving radio frequency (RF) signals. In an advantageous embodiment of the present invention, the test apparatus comprises: 1) a housing; 2) a first connector associated with the housing and capable of being coupled to a first cable coupled to the radio unit, wherein the first cable comprises a first plurality of signal lines carrying a plurality of base station signals between the radio unit and the non-radio unit; 3) a second connector associated with the housing and capable of being coupled to a second cable coupled to the non-radio unit, wherein the second cable comprises a second plurality of signal lines carrying the plurality of base station signals between the radio unit and the non-radio unit; and 4) a first access connector capable of allowing a signal measuring device to monitor at least one of the plurality of base station signals.

According to one embodiment of the present invention, the test apparatus further comprises a second access connector capable of allowing a first test signal to be injected into the radio unit via the first cable.

According to another embodiment of the present invention, the test apparatus further comprises a first switch capable of coupling a first selected one of the first plurality of signal lines to a second selected one of the second plurality of signal lines when the first switch is in a first switch position.

According to still another embodiment of the present invention, the first switch is further capable of coupling the first selected one of the first plurality of signal lines to a test point on the second access connector when the first switch is in a second switch position.

According to yet another embodiment of the present invention, the test apparatus further comprises a third access connector capable of allowing a second test signal to be injected into the non-radio unit via the second cable.

According to a further embodiment of the present invention, the second test signal is injected into the non-radio unit via the second cable when the first switch is in the second switch position.

According to a still further embodiment of the present invention, the first access connector is capable of allowing a test signal to be injected into the non-radio unit via the second cable.

According to a yet further embodiment of the present invention, the test apparatus further comprises an indicator light associated with the housing.

In one embodiment of the present invention, the indicator light is coupled to at least one of the first plurality of signal lines and illuminates to indicate the presence of a first selected one of the base station signals.

In another embodiment of the present invention, the first selected base station signal is a power supply voltage.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
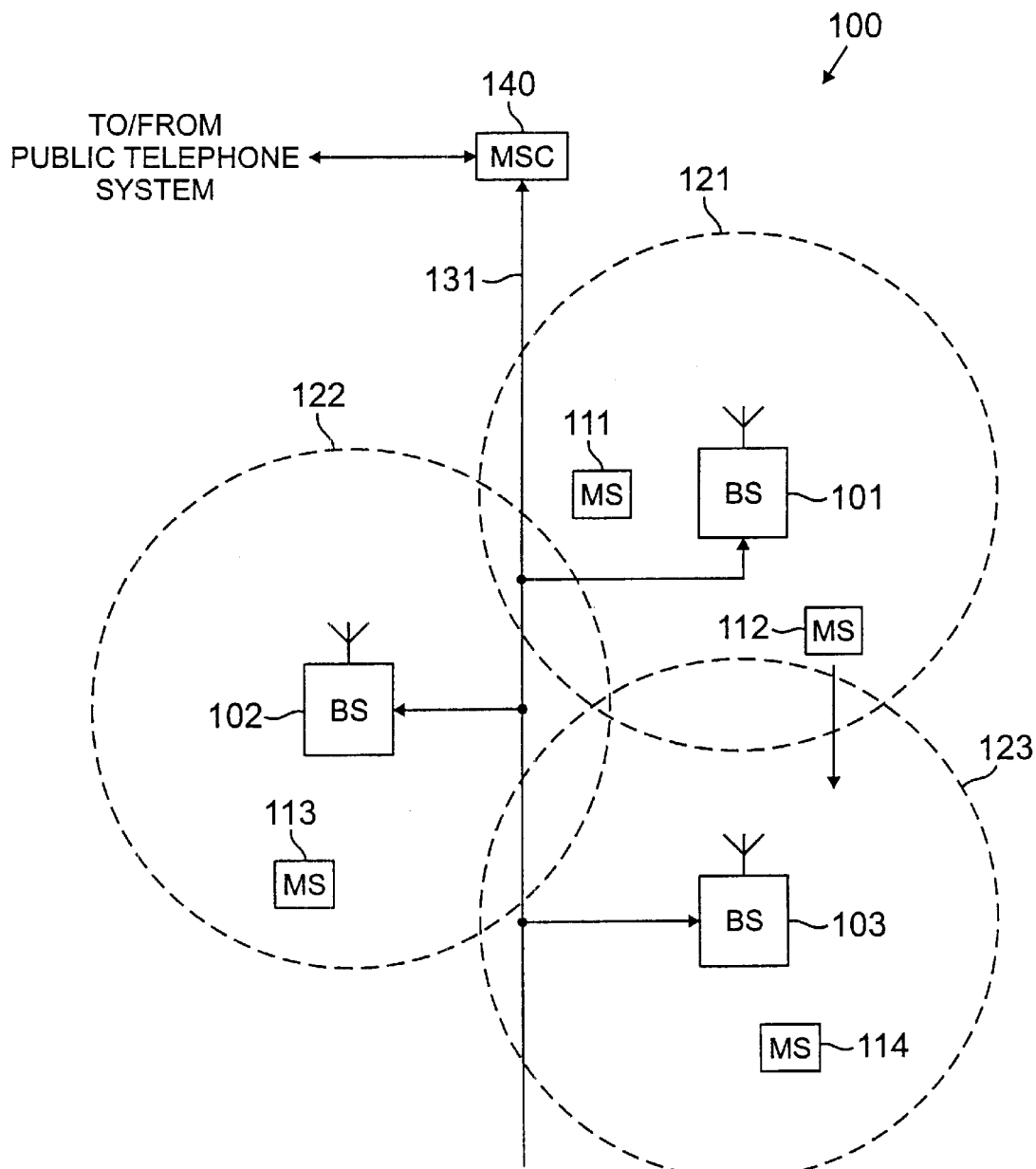
FIG. 1 illustrates an exemplary wireless network according to one embodiment of the present invention.
Figure 2:
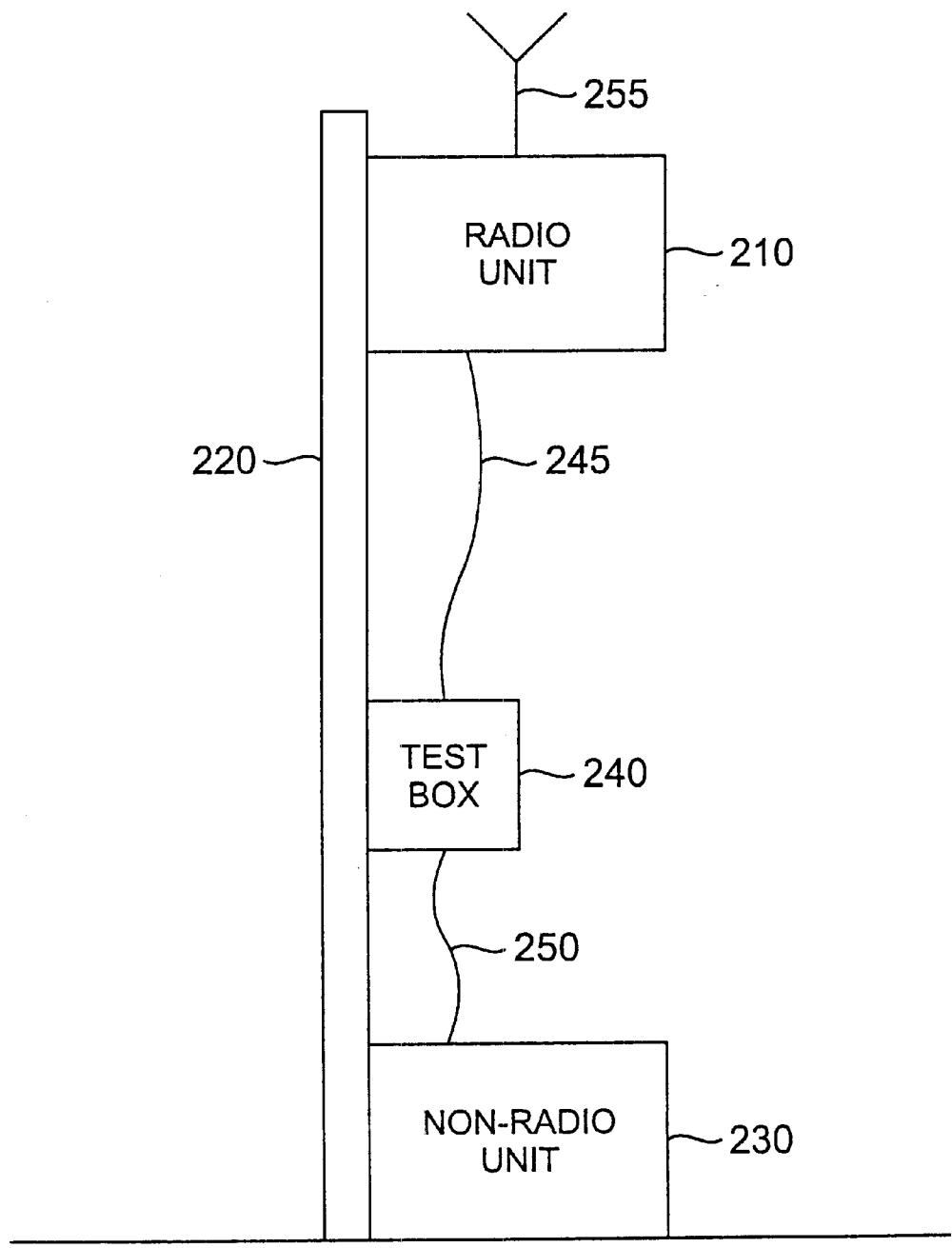
FIG. 2 illustrates in greater detail an exemplary base station in accordance with one embodiment of the present invention.
Figure 3:
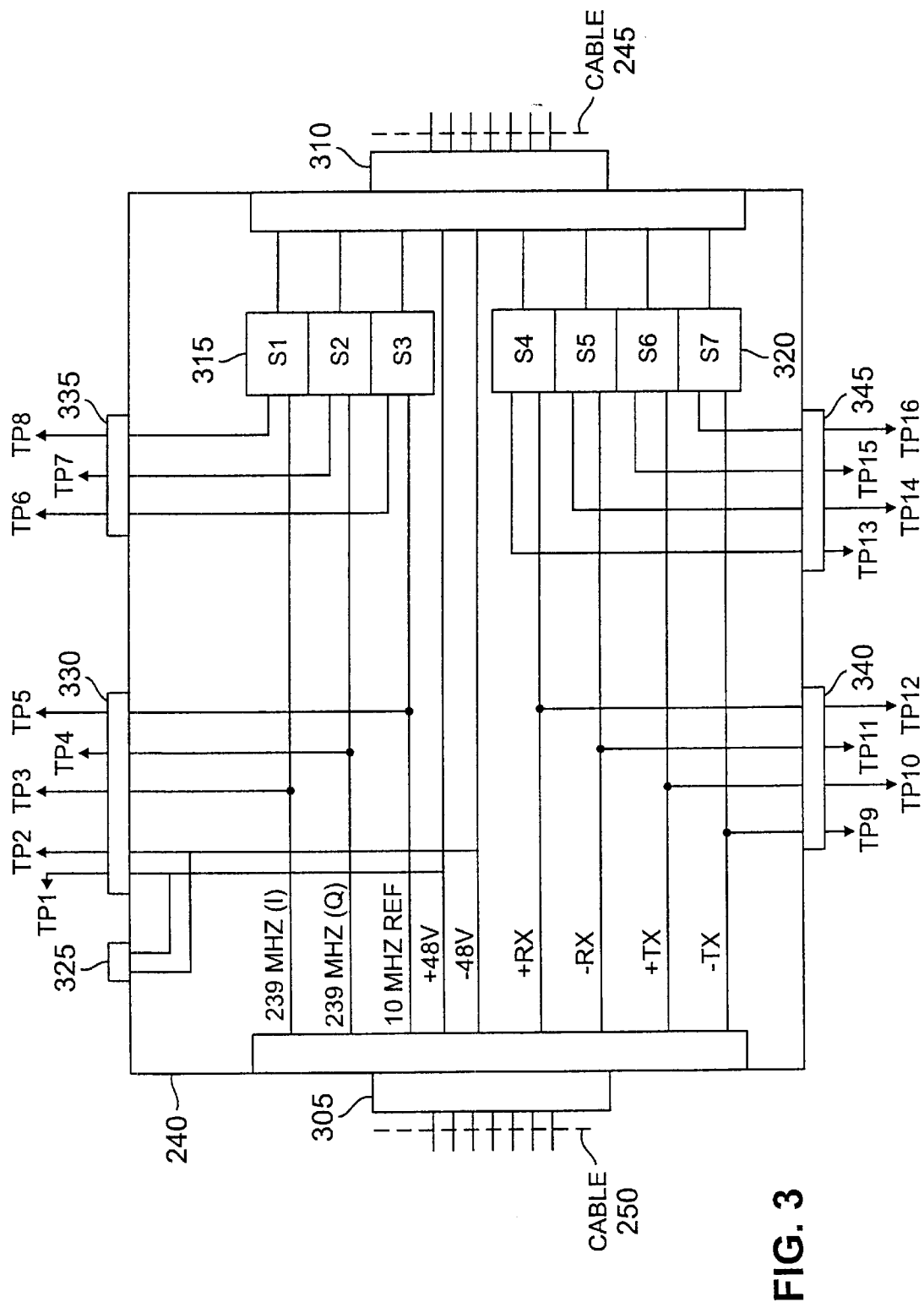
FIG. 3 illustrates in greater detail an exemplary test box in accordance with one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network base station.

FIG. 1 illustrates an exemplary wireless network 100 according to one embodiment of the present invention. The wireless telephone network 100 comprises a plurality of cell sites 121–123, each containing one of the base stations, BS 101, BS 102, or BS 103. Base stations 101–103 communicate with a plurality of mobile stations (MS) 111–114. Mobile stations 111–114 may be any suitable cellular devices, including conventional cellular telephones, PCS handset devices, portable computers, metering devices, and the like.

Dotted lines show the approximate boundaries of the cell sites 121–123 in which base stations 101–103 are located. The cell sites are shown approximately circular for the purposes of illustration and explanation only. It should be clearly understood that the cell sites also may have irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system. Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 12 3 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

In an advantageous embodiment of wireless network 100, one or more of the base stations may be implemented as modular and distributed units, rather than as integrated units. For example, one or more of BS 101, BS 102, or BS 103 may comprise a radio (or RF) unit in which RF functions are implemented and a separate non-radio (or non-RF or main) unit in which non-RF functions are implemented.

FIG. 2 illustrates in greater detail exemplary base station 101 in accordance with one embodiment of the present invention. Exemplary base station 101 comprises radio unit (RU) 210, utility pole 220, non-radio or main unit (MU) 230, test box 240, cables 245 and 250, and antenna array 255. In an advantageous embodiment, base station 101 is implemented as at least one radio unit 210 mounted at the top of utility pole 220 close to antenna array 255, thereby minimizing RF signal losses in lengthy cables. Additionally, the signal processing components of base station 101 may be implemented as at least one non-radio unit 230 located at a position remote from radio unit 210, such as at the bottom of utility pole 220. The present invention provides a testing interface for performing test measurements on the signals transferred between radio unit 210 and non-radio unit 230 without adding test equipment to each modular unit or requiring the use of test point patch panels on the housing of each modular unit.

In one embodiment of the present invention, test box 240 is located on utility pole 220 somewhere between non-radio unit 230 and radio unit 210. For example, test box 240 may be located at a height that is easily accessible by a technician standing next to utility pole 220. Test box 240 comprises interface circuitry that allows measurement of selected signals transferred between radio unit 210 and non-radio unit 230, and that also allows test signals to be injected into radio unit 210 or non-radio unit 230. Test box 240 may comprise one or more access connectors, such as test pads, test points, test connectors, test circuit boards, and input connectors for injecting selected test signals. Cable 245 and cable 230, including associated connectors, couple radio unit 210 and non-radio unit 230 to test box 240, respectively. Test box 240, cable 245, and cable 250 do not introduce a greater signal degradation between radio unit 210 and non-radio unit 230 than would occur with a single interconnecting cable and no intermediate test box.

FIG. 3 illustrates in greater detail exemplary test box 240 in accordance with one embodiment of the present invention. Test box 240 comprises cable connectors 305 and 310, switch banks 315 and 320, indicator 325, and access connectors 330, 335, 340, and 345. Exemplary test box 240 further comprises internal wiring between switch bank 315 and cable connectors 305 and 310, between switch bank 320 and cable connectors 305 and 310, between cable connector 305 and access connectors 330 and 340, between access connector 335 and switch bank 315, between access connector 345 and switch bank 320, and between indicator 325 and +48V and −48V power signal wires. Indicator 325 provides a visual indication for the presence of power in test box 240. Indicator 325 may be one of several devices, including a light-emitting-diode (LED) or low-powered incandescent lamp. Indicator 325 is lit (ON) when the +48V and −48V power signals are present and is unlit (OFF) if the power signals are not present.

Cable connector 305 mates with cable 250 which in turn connects to non-radio unit 230. Cable connector 305 transfers signals between cable 250 and the internal wiring of test box 240. In a similar manner, cable connector 310 mates with cable 245 which in turn mates with radio unit 210. Cable connector 310 transfers signals between cable 245 and the internal wiring of test box 240. Test box 240 provides access to selected important system signals transmitted between non-radio unit 230 and radio unit 210, such as a 239 MHz in-phase (I) signal, a 239 MHz quadrature (Q) signal, a 10 MHz reference (REF) signal, and +48V, −48V, +RX, −RX, +TX, and −TX signals. The +48V and −48V labeled connections are connected directly to connector 305, connector 310, indicator 325, and TP1 and TP2 on connector 330. The remaining signals are connected through switch bank 315 or switch bank 320 to points in test box 240.

Access connector 330 comprises five access test points, labeled TP1 through TP5. Access connector 335 comprises three access test points, labeled TP6 through TP8. Access connector 340 comprises four access test points, labeled TP9 through TP12. Access connector 345 comprises four access test points, labeled TP 13 through TP 16. Switch bank 315 comprises three switches, arbitrarily labeled S1, S2, and S3. Switch bank 320 comprises four switches, arbitrarily labeled S4 through S7.

The 239 MHZ in-phase signal is connected to TP3 of access connector 330 and one input of switch S1. The 239 MHZ quadrature signal is connected to TP4 of access connector 330 and one input of switch S2. The 10 MHZ reference signal is connected to TP5 of access connector 330 and one input of switch S3. The 239 MHz in-phase signal, the 239 MHz quadrature signal, and the 10 MHz reference signal may be measured directly at TP3, TP4, and TP5. The other inputs of switches S1, S2 and S3 are connected to TP6, TP7, and TP8 on access connector 335. In one switch position, switches S1, S2, and S3 connect the 239 MHz quadrature signal, and the 10 MHz reference signal, respectively, to cable connector 310. In the other switch position, switches S1, S2, and S3 connect TP6, 15. TP7, and TP8 to cable connector 310, thereby allowing test signals to be injected into TP6, TP7, and TP8 and into radio unit 210. Thus, if one or more of the 239 MHz in-phase signal, the 239 MHz quadrature signal, and the 10 MHz reference signal are not being properly generated by non-radio unit 230, switches S1, S2 and S3 may be switched to receive substitute test signals from TP6, TP7 and TP8 instead.

The +RX signal is connected to TP12 of access connector 340 and one input of switch S4. The −RX signal is connected to TP11 of access connector 340 and one input of switch S5. The +TX signal is connected to TP10 of access connector 340 and one input of switch S6. The −TX signal is connected to TP9 of access connector 340 and one input of switch S7. The +RX, −RX, +TX, and −TX signals may be measured directly at TP12, TP11, TP10, and TP9. The other inputs of switches S4, S5, S6, and S7 are connected to TP13, TP14, TP15, and TP16 on access connector 345. In one switch position, switches S4, S5, S6, and S7 connect the +RX, −RX, +TX, and −TX signals, respectively, to cable connector 310. In the other switch position, switches S4, S5, S6, and S7 connect TP13, TP14, TP15, and TP16 to cable connector 310, thereby allowing test signals to be injected into TP13, TP14, TP15, and TP16 and into radio unit 210. Thus, if one or more of the +RX, −RX, +TX, and −TX signals are not being properly generated by non-radio unit 230, switches S4, S5, S6, and S7 may be switched to receive substitute test signals from TP13, TP14, TP15, and TP16 instead.

In order to better understand the functionality of exemplary test box 240, consider the operation of switch S3 of switch bank 315 and the 10 MHz reference signal. The 10 MHz reference signal is connected to connector 305, TP5 on connector 330, and to one input of switch S3 in switch bank 315. A second input of switch S3 is connected to TP6 on connector 335. The output of switch S3 is connected to connector 310. During normal operation, switch S3 provides a straight-through connection between connector 305 and connector 310, allowing the 10 MHz reference signal to flow through cables 250 and 245. In this position, the 10 MHz reference signal is also available at TP5 for analysis purposes.

In its second position, switch S3 connects TP6 to connector 310. In the second position, switch S3 allows a 10 MHz test signal to be injected at TP6 into radio unit 210 (through switch S3, connector 310, and cable 245). At the same time, TP5 still allow the 10 MHz signal generated by non-radio unit 230 to be measured at test box 240.

Switch bank 315 and 320 also allow signals generated in radio unit 210 to be measured in test box 240 and also allow signals to be injected into non-radio unit 230 from test box 240. Suppose that radio unit 210 generates the 10 MHz reference signal and transmits it to non-radio unit 230. When switch S3 is in the second position, the 10 MHz reference signal can be monitored at TP6, while a 10 MHz test signal may be injected into non-radio unit 230 (through TP5 and connector 305). Thus, the second switch S3 position provides a minimum of two different arrangements for injecting and testing 10 MHz reference signals, depending upon the point of signal origination.

For this embodiment, each of switches S1–S7 operates in the same manner, with the transferred signal and point of signal origination being varied. Subsequently, the discussion for switch S3 is understood to apply also to S1 and S2, and S4 through S7. It should be noted, that depending upon the signal type, a pair of switches may be operated together. For instance, S4 and S5 may be operated at the same time and in the same manner for injection and analysis of the +RX and −RX signals.

Although the present invention has been described in detail, those skilled in the art should understand that they can make various changes, substitutions and alterations herein without departing from the spirit and scope of the invention in its broadest form.

What is claimed is:

1. For use in a wireless network base station comprising a non-radio unit capable of processing baseband signals and a radio unit separate from said non-radio unit capable of transmitting and receiving radio frequency (RF) signals, a test apparatus comprising:

a housing;
   a first connector associated with said housing and capable of being coupled to a first cable coupled to said radio unit, wherein said first cable comprises a first plurality of signal lines carrying a plurality of base station signals between said radio unit and said non-radio unit;
   a second connector associated with said housing and capable of being coupled to a second cable coupled to said non-radio unit, wherein said second cable comprises a second plurality of signal lines carrying said plurality of base station signals between said radio unit and said non-radio unit; and
   a first access connector capable of allowing a signal measuring device to monitor at least one of said plurality of base station signals.

2. The test apparatus as set forth in claim 1 further comprising a second access connector capable of allowing a first test signal to be injected into said radio unit via said first cable.

3. The test apparatus as set forth in claim 2 further comprising a first switch capable of coupling a first selected one of said first plurality of signal lines to a second selected one of said second plurality of signal lines when said first switch is in a first switch position.

4. The test apparatus as set forth in claim 3 wherein said first switch is further capable of coupling said first selected one of said first plurality of signal lines to a test point on said second access connector when said first switch is in a second switch position.

5. The test apparatus as set forth in claim 4 further comprising a third access connector capable of allowing a second test signal to be injected into said non-radio unit via said second cable.

6. The test apparatus as set forth in claim 5 wherein said second test signal is injected into said non-radio unit via said second cable when said first switch is in said second switch position.

7. The test apparatus as set forth in claim 2 wherein said first access connector is capable of allowing a test signal to be injected into said non-radio unit via said second cable.

8. The test apparatus as set forth in claim 1 further comprising an indicator light associated with said housing.

9. The test apparatus as set forth in claim 8 wherein said indicator light is coupled to at least one of said first plurality of signal lines and illuminates to indicate the presence of a first selected one of said base station signals.

10. The test apparatus as set forth in claim 9 wherein said first selected base station signal is a power supply voltage.

11. A base station for use in a wireless network comprising:
   a non-radio unit capable of processing baseband signals:
   a radio unit separate from said non-radio unit capable of transmitting and receiving radio frequency (RF) signals; and
   a test apparatus comprising:
      a housing;
      a first connector associated with said housing and capable of being coupled to a first cable coupled to said radio unit, wherein said first cable comprises a first plurality of signal lines carrying a plurality of base station signals between said radio unit and said non-radio unit;
      a second connector associated with said housing and capable of being coupled to a second cable coupled to said non-radio unit, wherein said second cable comprises a second plurality of signal lines carrying said plurality of base station signals between said radio unit and said non-radio unit; and
      a first access connector capable of allowing a signal measuring device to monitor at least one of said plurality of base station signals.

12. The base station as set forth in claim 11 further comprising a second access connector capable of allowing a first test signal to be injected into said radio unit via said first cable.

13. The base station as set forth in claim 12 further comprising a first switch capable of coupling a first selected one of said first plurality of signal lines to a second selected one of said second plurality of signal lines when said first switch is in a first switch position.

14. The base station as set forth in claim 13 wherein said first switch is further capable of coupling said first selected one of said first plurality of signal lines to a test point on said second access connector when said first switch is in a second switch position.

15. The base station as set forth in claim 14 further comprising a third access connector capable of allowing a second test signal to be injected into said non-radio unit via said second cable.

16. The base station as set forth in claim 15 wherein said second test signal is injected into said non-radio unit via said second cable when said first switch is in said second switch position.

17. The base station as set forth in claim 12 wherein said first access connector is capable of allowing a test signal to be injected into said non-radio unit via said second cable.

18. The base station as set forth in claim 11 further comprising an indicator light associated with said housing.

19. The base station as set forth in claim 18 wherein said indicator light is coupled to at least one of said first plurality of signal lines and illuminates to indicate the presence of a first selected one of said base station signals.

20. The base station as set forth in claim 19 wherein said first selected base station signal is a power supply voltage.

* * * * *